(12) United States Patent
Cabrel et al.

(10) Patent No.: US 12,152,951 B2
(45) Date of Patent: Nov. 26, 2024

(54) DEVICE, SYSTEM AND METHOD FOR TESTING SCREWING DEVICES

(71) Applicant: SCS CONCEPT S.R.L., Cusano Milanino (IT)

(72) Inventors: Marco Cabrel, Corsico (IT); Roberto Boccellato, Seriate (IT)

(73) Assignee: SCS CONCEPT S.R.L., Cusano Milanino (IT)

( * ) Notice: Subject to any disclaimer, the term of this patent is extended or adjusted under 35 U.S.C. 154(b) by 845 days.

(21) Appl. No.: 17/251,392

(22) PCT Filed: Jun. 26, 2019

(86) PCT No.: PCT/IB2019/055376
§ 371 (c)(1),
(2) Date: Dec. 11, 2020

(87) PCT Pub. No.: WO2020/003143
PCT Pub. Date: Jan. 2, 2020

(65) Prior Publication Data
US 2021/0278301 A1   Sep. 9, 2021

(30) Foreign Application Priority Data
Jun. 27, 2018  (IT) .......................... 102018000006705

(51) Int. Cl.
*G01L 5/24*       (2006.01)
*G01B 21/22*      (2006.01)
(Continued)

(52) U.S. Cl.
CPC ................ *G01L 5/24* (2013.01); *G01B 21/22* (2013.01); *G01L 25/003* (2013.01); *G08C 17/00* (2013.01); *H02J 50/10* (2016.02)

(58) Field of Classification Search
CPC ......... G01L 25/003; G01L 5/24; G01L 25/00; G01L 5/00; G01L 3/00; G01L 5/0028;
(Continued)

(56) References Cited

U.S. PATENT DOCUMENTS 7,275,450 B2 * 10/2007 Hirai ................... B25B 23/0078
                                                      73/862.21
8,485,049 B2 *  7/2013 Yokoyama .............. B25B 23/14
                                                      73/862.21
(Continued)

FOREIGN PATENT DOCUMENTS

DE    102012017376 A1   12/2013
JP       2004251697 A *  9/2004
(Continued)

OTHER PUBLICATIONS

International Search Report of PCT/IB2019/055376, mailed Sep. 27, 2019, 3 pages.
International Search Report mailed Sep. 27, 2019; 3 pages.

*Primary Examiner* — Judy Nguyen
*Assistant Examiner* — James Split
(74) *Attorney, Agent, or Firm* — Perkins Coie LLP; Sean Seokwon Lee; Viola T. Kung

(57) ABSTRACT

A test device (10) for testing screwing devices, comprising a shaft (14) with an end (15) for connection to a screwing device and an opposite end (16) for connection to a joint to be screwed. The device (10) further comprises a first transducer (18) for detecting the rotation angle of the shaft (14) and a second transducer (19) for detecting the torque transmitted by the shaft (14) between the two ends (15, 16). The device (10) further comprises a control unit (20), an NFC communication module (31), a memory (30), and means (24, 31) for communication with the outside. The control unit stores in the memory (30) an identification code received from the NFC communication module (31) and (Continued)

associates it in the memory (30) with test data obtained from the first and second transducers (18, 19). Then the communication means (24, 31) send to the outside data obtained from the contents of the memory (30). A method for testing and managing the tests and a system which comprises in addition to the test device (10) also at least one NFC tag (33) are also described.

11 Claims, 1 Drawing Sheet

(51) Int. Cl.
*G01L 25/00* (2006.01)
*G08C 17/00* (2006.01)
*H02J 50/10* (2016.01)

(58) Field of Classification Search
CPC ..... G01L 5/0042; B25B 23/14; B25B 23/147; G01B 21/22; G01M 99/008; G08C 17/00; H02J 50/10
See application file for complete search history.

(56) References Cited

U.S. PATENT DOCUMENTS

| | | | |
|---|---|---|---|
| 9,126,317 B2* | 9/2015 | Lawton | G06Q 10/20 |
| 10,055,623 B2* | 8/2018 | Chu | G06K 7/10366 |
| 10,139,299 B2* | 11/2018 | Molino | B25B 23/14 |
| 10,744,625 B2* | 8/2020 | Chu | B25B 13/06 |
| 10,933,519 B2* | 3/2021 | Cabrel | B25B 23/147 |
| 11,525,713 B2* | 12/2022 | Giannone | B25B 21/00 |
| 2003/0105599 A1* | 6/2003 | Fisher | B25B 23/14 |
| | | | 702/41 |
| 2009/0237029 A1* | 9/2009 | Andelfinger | H02J 50/12 |
| | | | 320/108 |

FOREIGN PATENT DOCUMENTS

| | | |
|---|---|---|
| WO | 2016055933 A1 | 4/2016 |
| WO | 2017216700 A1 | 12/2017 |

* cited by examiner

DEVICE, SYSTEM AND METHOD FOR TESTING SCREWING DEVICES

This application is a National Stage of International Application PCT/IB2019/055376, filed Jun. 26, 2019, published Jan. 2, 2020, under PCT Article 21(2) in English; which claims the priority of Italian Application Nos. 102018000006705, filed Jun. 27, 2018. The contents of the above-identified applications are incorporated herein by reference in their entireties.

The present invention relates to an innovative test device, to an innovative test system and to an innovative test method for screwing devices.

Here, the term "screwing device" is understood as meaning any instrument which performs tightening of a joint with torque and angle control, for example a motorized electronic screwing device or an electronic torque wrench.

In the prior art it is well known that there exists the need to check periodically screwing devices in order to ensure that they have the necessary operational uniformity and precision.

Usually, the checks are carried out using test benches which test the screwing device, simulating a screw being tightened and recording the behaviour of the device during the simulation.

However, since the test is thus performed by means of a simulation sometimes there arises the need to test the behaviour of the screwing device in the field.

For this purpose, test devices consisting of a rotating torque and angle transducer are used, said transducer being temporarily inserted between the screwing device and the actual joint to be screwed. This transducer thus records the real trend, in the field, of the torque and angle during a normal operation of the screwing device. The results of the measurement are then transferred to an electronic system (for example a personal computer) for an analysis and check as to their conformity.

Usually these test devices must be connected stably to the electronic system which stores the analysis data as it is recorded by the device. Moreover, usually a certain amount of training is necessary for the person who manages the system and must determine in each case exactly on which screwing device the test is being carried out and must associate the measurement data with the screwing device. All this creates a certain amount of inconvenience on an operational level and prevents the normal employment of the screwing device by the person who normally uses it in the field. For example, in industry (e.g. the automobile industry) usually there are assembly stations where one or more operators are present, each with their own screwing device and carrying out tightening operations on the various parts of the objects which reach the station.

In this situation, it is easy to imagine the problems which are created by the arrival of a further operator who has the task of recording with a test device the operation of the various screwing devices and who must sequentially place the test device between each screwing device and each joint to be tightened by that particular test device and must also identify the specific screwing device, set the analysis system using the data of the screwing device on which measurements are being carried out in that moment and, if necessary, enter into the system the data necessary for identifying the joint on which the screwing device is being used.

The general object of the present invention is to overcome the aforementioned drawbacks of the prior art, providing a device which allows the screwing devices to be checked in the field in a rapid and efficient manner.

A further object is to provide a test system equipped with such a device.

A further object is to provide a test method using this device and system.

In view of these objects the idea which has occurred is that of providing a test device for testing screwing devices, comprising an outer body in which a shaft is rotatably supported with an end for connection to a screwing device and an opposite end for connection to a joint to be screwed, the device further comprising a first transducer for detecting the rotation angle of the shaft and a second transducer for detecting the torque transmitted by the shaft between the two ends, characterized by comprising internally a control unit, an NFC communication module that is suitable for receiving an identification code from the outside, a memory, and communication means for communicating with the outside, the first and second transducers, the communication module, the memory and the communication means being connected to the control unit so that the control unit stores in the memory an identification code received from the NFC communication module associating it in the memory with test data obtained from the first and second transducers and, via the communication means, sends to the outside data obtained from the contents of the memory.

The idea has also occurred of providing a test system comprising at least one test device as mentioned above and at least one NFC tag for sending an identification code to the communication module.

Another idea which has occurred is that of providing a method for the execution and management of tests of the operation of at least one screwing device on a joint in at least one assembly station, comprising a test system according to any one of the preceding claims, comprising the steps of using the test device for:

a) receiving, via the NFC communication module, at least one identification code associated with the screwing device and/or with the joint and/or with the assembly station;

b) storing the at least one identification code in the memory;

c) acquiring angle and torque measurements from the first and second transducers during the action of the screwing device on the joint;

d) storing obtained data from such measurements in the memory and associating them with the at least one identification code;

repeating steps a)-d) if necessary for other screwing devices or the same screwing device; and finally:

e) transferring obtained data from the contents of the memory to an external analysis unit.

In order to illustrate more clearly the innovative principles of the present invention and its advantages compared to the prior art, an example of embodiment applying these principles will be described below with the aid of the accompanying drawings. In the drawings.

Figure 1:
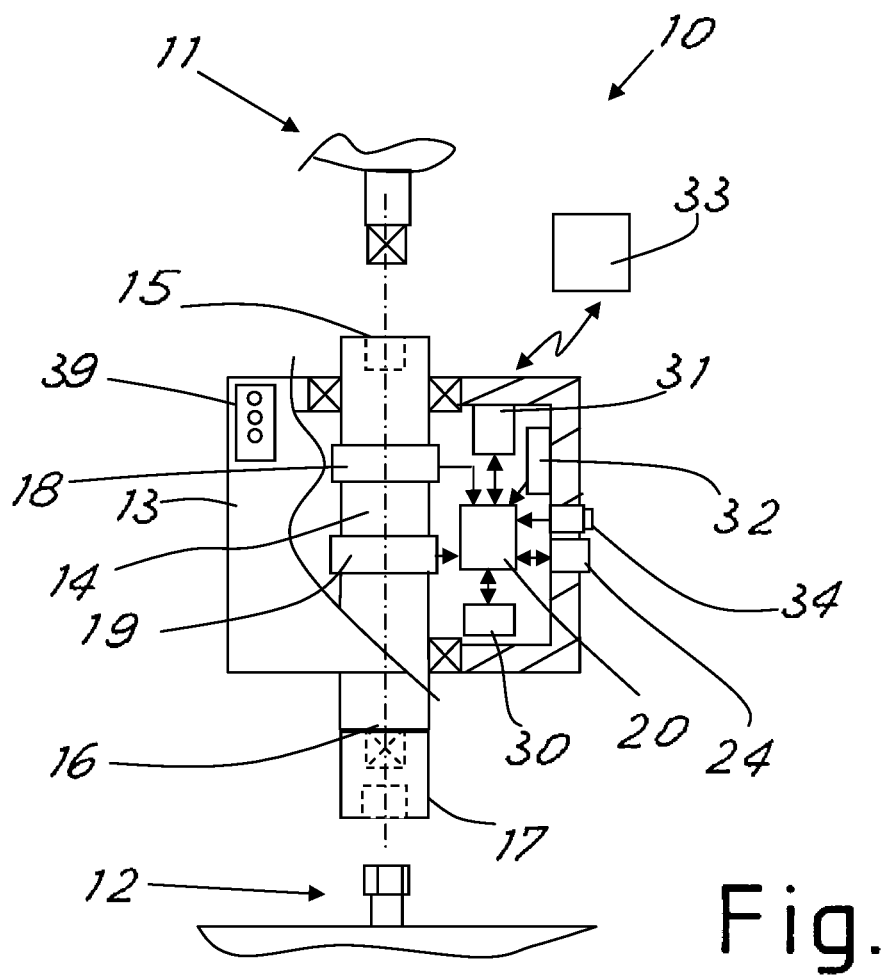
FIG. 1 shows a schematic view of a test device for screwing devices and a part of a system with such a device, provided according to the invention.
Figure 2:
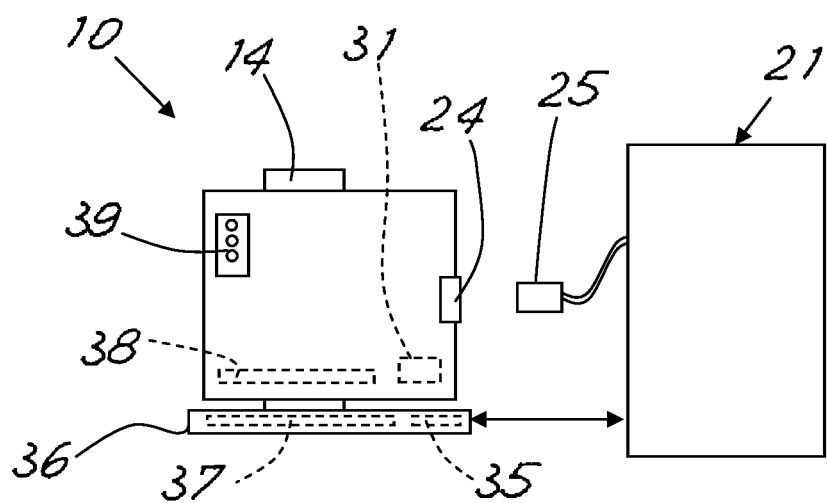
FIG. 2 shows a schematic view of the test device according to FIG. 1 connected to another possible part of a system according to the invention.

With reference to the Figures, FIG. 1 shows in schematic form a test device provided in accordance with the invention and denoted generally by 10.

Such a device is intended to be temporarily inserted between a screwing device 11 (for example a motorized screwing device or an electronic torque wrench) and a joint 12 to be screwed.

The test device comprises an outer housing or body 13 which rotatably supports a shaft 14 with the two ends facing each other on opposite sides of the body 13.

The shaft 14 comprises at one of its ends a coupling device 15 for the screwing device and at the opposite end a coupling device 16 intended to be connected to the operating end of the joint 12. For example, the connection may be performed by means of a bush 17 which in turn is suitable for engagement with the joint 12.

For example, the bush 17 may be the same bush which is used by the screwing device 11 and which is temporarily removed from the end of the screwing device so as to be mounted on the end 16.

The device 10 comprises a transducer 18 (for example an incremental encoder) which detects the rotation angle of the shaft 14 and a transducer 19 (for example a load cell) for detecting the torque transmitted via the shaft 14. These transducers 18 and 19 are per se essentially known and therefore will not be further shown or described here.

The test device 10 also comprises an electronic unit 20 (for example with a suitably programmed microprocessor) which processes the signals received from the transducers.

The test device 10 also comprises a memory 30 in which the electronic unit 20 stores the data of the tests carried out and a wireless communication module 31, advantageously of the NFC (Near Field Communication) type, which allows the unit 20 to receive at least data from the outside or preferably exchange data with the outside. An NFC communication system has been found to be particularly advantageous because it operates at short range (generally at a distance of no more than ten or so centimetres, and therefore avoids interference and allows easy point-to-point communication between two devices simply by moving the two devices closer together within the range of action defined for the NFC communication system. This allows easy use of the device according to the invention, as will become clear below.

The device 10 also has advantageously an internal electric power supply battery 32 for autonomous powering thereof.

The device may store in the memory 30 an identification code received via the module 31 and associate it with the measurements performed which are also stored in the memory 30. The storage and association of the code with the measurements may be for example controlled by means of the pressing of a pushbutton 34 or may be automatically activated upon reception of an identification code by the module 31.

For example, the unit 20 may be activated by pressing the button 34 in order to store in the memory 30 the first code received from the module 31 after pressing the button 34. Then the angle and torque measurements performed on the shaft 14 are also stored (for example as a value curve or sequence) in the memory 30 so as to be associated with the code. For example, the measurements may be stored in the memory 30 in the form of a table, with the identification codes which in the memory 30 provide an indicator of the various measurements in the table.

The memory 30 may comprise one or more zones for storing the identification codes and one or more zones for storing the measurement data obtained from the transducers and associated with the stored identification codes.

In the event of storage of the codes by means of pressing of the button 34, by further pressing the button 34 it is for example possible to repeat the cycle with a successive code received and new successive angle and torque measurements, and so on, for example until the memory 30 is full.

Alternatively, the storage and association cycle may be activated whenever the module 31 receives an identification code, instead of when the button 34 is pressed. In addition or alternatively, the button 34 may also be used to switch on and switch off the test device 10.

The test device 10 may also have devices or units 39 for displaying information, consisting for example of a display or indicator lamps (in particular LEDs), these being controlled by the unit 20 so as to display information about the device 10.

For example, the display devices may provide indications about the correct reception of an identification code, the start or the end of the measurements, the full or empty state of the memory 30, the charged state of the internal batteries, etc.

With the aforementioned test device according to the invention easy and efficient stand-alone operation of the said test device is possible.

In fact, a user merely has to move the device 10 close to any device which emits a valid identification code which can be received by the module 31 and then use the device 10 between a screwing device to be checked and a joint to be tightened using said screwing device. The device 10 will store the measurement cycle and associate it with the identification code. The same user of the screwing device may easily perform this operation without the need for action by a further specialized operator.

The test operation may be repeated on any number of screwing devices until the memory 30 is full.

By means of the identification codes associated with the torque and angle measurements in the memory 30 it is possible subsequently to distinguish between the various tests and identify the screwing device and/or the station and/or the joint and/or the operator who carried out the tests.

For example, if the screwing devices comprise a system for NFC transmission of an associated unique identification code, it is merely required to move the device 10 according to the invention close to the screwing device to be tested in order for the screwing device to be recognized and associated with the measurements carried out on it by the test device 10.

If desired, the identification codes which are associated with a measurement may also be more than one so that this measurement may be associated with several elements. For example, it may be envisaged that the device 10 receives an identification code for identifying the screwing device, an identification code for identifying the joint which is tightened and/or an identification code for identifying the assembly station where the joint is tightened. The various identification codes may also contain a code part with the information which identifies the type of element to which the code belongs. For example, for each code received there may be a code part which contains the information indicating that the code is that one which identifies a screwing device, a joint or a station.

A code may also be used to identify the operator who is performing the tightening operation.

In order to transmit the desired identification code to the device 10 various solutions may be used.

In particular, according to one aspect of the invention a system comprising in addition to the device 10 also one or more NFC tags 33 able to exchange data with the module 31 may be provided. The NFC tags may be advantageously made in the form of labels, cards or other elements to be affixed where necessary.

Advantageously, each NFC Tag contains a unique identification code as mentioned above which may be emitted by the tag towards the module 31 when the tag and module 31 are moved close together within the predetermined NFC transmission range. The device 10 recognizes the code emitted and stores it in the memory 30.

Advantageously, a tag 33 will be associated with a corresponding screwing device so that the code in the tag uniquely identifies said screwing device.

Again advantageously, a tag 33 may also be associated with a corresponding joint to be screwed so that the code in the tag uniquely identifies said joint.

Again advantageously a tag 33 may also be associated with a corresponding station where the screwing devices are used so that the code in the tag uniquely identifies said station, etc.

In particular, adhesive tags may be affixed onto each screwing device, on a surface in the vicinity of each joint to be tightened and identified, and/or at the entry point of each station which is to be distinguished.

The user of the test device, who may also be the same user of a screwing device, when it is required to carry out a test, needs only move the test device close to the correct tag or tags 33 and then insert the device 10 between the screwing device and joint and carry out a normal tightening operation, as if the device 10 were not present. Once the test has been completed, the user may put away the device 10, pass it to another user or use it for another test after moving it towards the corresponding tags.

The interference with the normal tightening operations carried out in the field is therefore minimal.

The test device 10 further comprises advantageously communication means at least for sending data to the outside. These means may comprise a connector 24 and/or wireless communication devices. The latter may also be advantageously formed by or comprise the same communication module 31. As will become clear below, the data sent to the outside may be obtained by the unit 20 from the contents of the memory 30.

At the end of all the test operations (for example at the end of the day) it is therefore possible to discharge in a suitable external analysis unit or device 21 the data of the tests carried out and obtained by the unit 20 from the data which is stored in the memory 30 of the device 10 and comprises the measurements and the associated identification codes. The analysis unit 21 may thus separate the various tests and recognize with which screwing device and if necessary by whom and/or on what joint and/or in which station they were carried out. The analysis test may comprise or be connected to a monitor on which the tests and the associated identification data are shown and optionally a selection and control keyboard. The operation of analysing the data transferred from the device 10 may be carried where necessary by specialized personnel (for example responsible for quality control) who, owing to the innovative characteristics of the invention, must not be necessarily present during the test operations carried out in the field.

The external analysis unit may be of a type per se essentially known for this type of analysis. For example, it may comprise a suitable connection interface known per se and a personnel computer with a suitable program which allows the data of the measurements performed by the test device to be shown, analysed, saved, etc., as may now be easily imagined by the person skilled in the art.

As mentioned above, the connection between the test device 10 and an analysis unit 21 may be performed by means of any known system, for example by means of cable or wireless communication channel. For example the connector 24 may be provided on the body 13 of the device and a complementary connector 25 provided on the analysis unit 21. The connector 24 and connector 25 may also be replaced by corresponding known wireless data transmission units.

In a possible embodiment according to the invention, the transfer of data may also be performed by means of the same NFC module 31 and a corresponding NFC module 35 connected to the analysis unit 21. The module 35 may be contained in a base or cradle 36 on which the device 10 is placed and which may form part of the test system according to the invention.

Moreover, advantageously, the base or cradle 36 may also comprise a per se known transmitter 37 for transferring electric power by means of inductive coupling and the device 10 may in turn comprise a per se known recharging circuit 38 which is inductively coupled with the power transmitter 37 when the device 10 is on the base or cradle 36 in order to perform recharging of the battery 32 of the device 10.

The NFC communication system may also serve locally for the recharging base in order to set the recharging base suitably depending on the coupling with a specific device 10 and/or for example so as to allow the analysis unit 21 to recognize the model and/or identity of the device 10 placed on the base.

The NFC connection may also serve if necessary for exchanging parameters useful for recharging (such as the charged state of the batteries and/or the number of recharging operations already carried out by the specific device 10). The base 36 may for example in this way set the recharging parameters on the basis of the information exchanged.

All this simplifies further the use of the system according to the invention.

For example, at the end of the in-field tests, the device 10 may be placed on its base or cradle 36 and be recharged and if necessary transfer the data to the analysis unit 21 without the need to provide physical electrical connections and/or carry out specific commands.

At this point it is clear how the objects of the invention are achieved.

Using a test device according to the invention it is possible to record with precision in the field both the angle and the torque imparted by various screwing devices without hindering the normal tightening operations and if necessary without the need for personnel specialized in quality control and without the need to record manually the single tests carried out.

The system according to the invention allows a plurality of test devices to be easily managed and allows easy operation in complex environments, for example where there are a lot of screwing devices, many tightening stations and/or many joints to be tightened. The method used allows the tests to be carried out and managed in the field in complex environments in a simple, easy and quick manner, with the possibility of analysis after acquisition of the test results in the field. Obviously, the above description of an embodiment applying the innovative principles of the present invention is provided by way of example of these innovative principles and must therefore not be regarded as limiting the scope of the rights claimed herein.

For example the exact structure of the test device may be different from that shown by way of example and also comprise further sensors, elements, accessories and devices, for example for transmitting the data remotely or for performing mechanical adaptation to specific screwing devices and/or joints to be screwed, etc., as may now be easily imagined by the person skilled in the art.

The invention claimed is:

1. A test device (10) for testing screwing devices, comprising an outer body (13) in which a shaft (14) is rotatably supported with an end (15) for connection to a screwing device and an opposite end (16) for connection to a joint to be screwed, the device (10) further comprising a first transducer (18) for detecting the rotation angle of the shaft (14) and a second transducer (19) for detecting the torque transmitted by the shaft (14) between the two ends (15, 16), the device further comprising internally a control unit (20), an NFC communication module (31) that is suitable for receiving identification codes from the outside, a memory (30), and communication means (24, 31) for communicating with the outside, the first and second transducers (18, 19), the NFC communication module (31), the memory (30) and the communication means (24, 31) being connected to the control unit (20) so that the control unit stores in the memory (30) at least two identification codes received from the NFC communication module (31) in association with test data obtained from the first and second transducers (18, 19), wherein the at least two identification codes are for identifying the screwing device and at least one of: the joint to be screwed or an assembly station where the joint is screwed, and, via the communication means (24, 31), the control unit (20) sends to the outside the test data obtained, and the associated at least two identification codes, from the contents of the memory (30).

2. The test device (10) according to claim 1, further comprising an internal electric power supply battery (32).

3. The test device (10) according to claim 2, further comprising a recharging circuit (38) for inductive charging of the internal electric battery (32).

4. The test device (10) according to claim 1, further comprising a pushbutton (34) connected to the control unit (20) for controlling the reception and/or storage of an identification code and test data obtained from the first and second transducers (18, 19).

5. The test device (10) according to claim 1, characterized in that the communication means comprise a connector (24) and/or a wireless data transfer unit (31).

6. A test system comprising at least one test device (10) according to claim 1 and at least one NFC tag (33) for sending an identification code to the NFC communication module (31).

7. The test system according to claim 6, characterized by comprising a base (36) for receiving the device (10), the base being equipped with a wireless communication module (35) for exchanging data with said communication means, which include a wireless data transfer unit (31).

8. The test system according to claim 6, characterized by comprising a base (36) for receiving the device (10), the base being equipped with a transmitter module (37) for transferring electrical power by means of inductive coupling so as to transfer electric power to the test device (10) in order to recharge an internal power supply battery (32).

9. The test system according to claim 6, characterized by comprising an external analysis unit (21) which receives test data from the test device (10).

10. A method for the execution and management of tests of the operation of at least one screwing device on a joint in at least one assembly station, comprising the test system according to claim 6, comprising the steps of using the test device (10) for:
   a) receiving, via the NFC communication module (31), at least two identification codes respectively associated with the screwing device and at least one of the joint or an assembly station;
   b) storing the at least two identification codes in the memory (30);
   c) acquiring angle and torque measurements from the first and second transducers during the action of the screwing device on the joint;
   d) storing data obtained from such measurements in the memory (30) and associating them with the at least two identification codes;
   repeating steps a)-d) if necessary for other screwing devices or the same screwing device; and finally:
   e) transferring obtained data, and the associated at least two identification codes, from the contents of the memory (30) to an external analysis unit (21).

11. The method according to claim 10, characterized in that, before executing steps a)-e), steps are taken to associate with the screwing device and/or with the joint and/or with the assembly station (33) an NFC tag which sends a corresponding identification code to the NFC communication module (31) when the test device (10) is moved to within a distance allowing communication between the NFC communication module (31) and the NFC tag (33).

* * * * *